United States Patent
Gotfried

(10) Patent No.: US 7,352,951 B2
(45) Date of Patent: Apr. 1, 2008

(54) METHOD FOR DISPLAYING ADVERTISEMENTS

(76) Inventor: Bradley L. Gotfried, 30-31 Sai Kung Tai Street, Sai Kung, New Territories (HK)

( * ) Notice: Subject to any disclaimer, the term of this patent is extended or adjusted under 35 U.S.C. 154(b) by 0 days.

(21) Appl. No.: 11/383,716

(22) Filed: May 16, 2006

(65) Prior Publication Data
US 2006/0280423 A1    Dec. 14, 2006

Related U.S. Application Data

(63) Continuation of application No. 10/424,249, filed on Apr. 28, 2003, now abandoned.

(51) Int. Cl.
*G02B 6/00* (2006.01)
*G09F 9/305* (2006.01)

(52) U.S. Cl. .................. 385/147; 385/901; 362/559

(58) Field of Classification Search .................. None
See application file for complete search history.

(56) References Cited

U.S. PATENT DOCUMENTS

| | | |
|---|---|---|
| 3,168,617 A | 2/1965 | Richter |
| 3,681,164 A | 8/1972 | Bazinet, Jr. et al. |
| 3,881,976 A | 5/1975 | Jones |
| 4,234,907 A | 11/1980 | Daniel |
| 4,329,739 A | 5/1982 | Loebner |
| 4,340,929 A | 7/1982 | Konikoff et al. |
| 4,425,601 A | 1/1984 | Donahue |
| 4,521,205 A | 6/1985 | Spector |
| 4,597,030 A | 6/1986 | Brody et al. |
| 4,752,114 A | 6/1988 | French |
| 4,754,372 A * | 6/1988 | Harrison ............... 362/565 |
| 4,807,095 A | 2/1989 | Bell |
| 4,884,865 A | 12/1989 | Grise |
| 5,550,946 A | 8/1996 | Muehlemann et al. |
| 5,813,148 A | 9/1998 | Guerra |
| 6,078,704 A | 6/2000 | Bischel et al. |
| 6,082,886 A | 7/2000 | Stanford |
| 6,195,016 B1 * | 2/2001 | Shankle et al. ......... 340/815.42 |
| 6,198,872 B1 * | 3/2001 | Lipson et al. ............... 385/117 |
| 6,204,778 B1 | 3/2001 | Bergan et al. |
| 6,430,605 B2 | 8/2002 | Hunter |
| 6,651,365 B1 | 11/2003 | Wainwright |
| 6,718,104 B2 | 4/2004 | Lowry |

(Continued)

FOREIGN PATENT DOCUMENTS

FR    GB 2 184 282 A    6/1987

*Primary Examiner*—Rodney Bovernick
*Assistant Examiner*—Mike Stahl
(74) *Attorney, Agent, or Firm*—Akerman Senterfitt

(57) ABSTRACT

The present invention concerns a method for displaying advertisements including the steps of providing at least one non-transparent cable for transmitting light in which an end of each non-transparent cable is received by a receiving structure and transmitting light selected from a plurality of colors along the non-transparent cables such that the light is emitted from the ends of the non-transparent cables received by the receiving structure. The emitted light forms a display in accordance with at least one of a pre-programmed design, and the display is an advertisement or a simulated floor covering. The non-transparent cable can be a fiber optic cable, and the method can further include the step of incorporating the receiving structure into an infrastructure. As an example, the infrastructure can be a travel way that supports at least one of vehicular traffic and pedestrian traffic.

12 Claims, 9 Drawing Sheets

U.S. PATENT DOCUMENTS

| | | | |
|---|---|---|---|
| 7,018,084 B2 * | 3/2006 | Gotfried | 362/576 |
| 2002/0097978 A1 | 7/2002 | Lowry et al. | |
| 2002/0116717 A1 | 8/2002 | Eller et al. | |
| 2002/0159275 A1 | 10/2002 | Nicholls et al. | |
| 2004/0049960 A1 * | 3/2004 | Percy | 40/590 |
| 2004/0213020 A1 | 10/2004 | Gotfried | |
| 2005/0052883 A1 | 3/2005 | Qi et al. | |
| 2007/0052636 A1 * | 3/2007 | Kalt et al. | 345/83 |

* cited by examiner

METHOD FOR DISPLAYING ADVERTISEMENTS

CROSS REFERENCE TO RELATED APPLICATIONS

This application is a continuation of U.S. Patent application Ser. No. 10/424,249, filed Apr. 28, 2003 now abandoned, the entirety of which is herein incorporated by reference.

STATEMENT REGARDING FEDERALLY SPONSORED RESEARCH OR DEVELOPMENT (Not Applicable)

BACKGROUND OF THE INVENTION

1. Technical Field

The present invention relates generally to advertising and more particularly, to the manipulation of lighting to generate advertisements.

2. Description of Related Art

Many businesses rely on advertising to promote their goods or services. For example, a large number of companies buy blocks of advertising on television or radio stations. Many other concerns rent billboard space along major thoroughfares in an effort to attract the attention of drivers and passengers or post advertisements on billboards that are mounted on the sides of buildings in an attempt to garner the attention of pedestrians.

Although effective, these types of advertising have several drawbacks. Specifically, placing advertisements on television or radio is very expensive. Also, a substantial portion of the consuming public switches channels at the outset of a commercial, which makes it difficult to reach these individuals. Further, many individuals ignore billboard advertising, as the medium is ubiquitous and somewhat uninspiring. Another disadvantage of billboard advertising is that the advertisement, once placed on the billboard, is relatively permanent, and typically, a crew is required to change it. Accordingly, what is needed in the art is a method of advertising that is relatively inexpensive, captures the attention of the consuming public and enables a business to change advertisements quickly and efficiently.

SUMMARY OF THE INVENTION

The present invention also concerns a method for displaying advertisements. The method includes the steps of providing at least one non-transparent cable for transmitting light in which an end of each non-transparent cable is received by a receiving structure and transmitting light selected from a plurality of colors along the non-transparent cables such that the light is emitted from the ends of the non-transparent cables received by the receiving structure. The emitted light forms a display in accordance with at least one of a pre-programmed design, and the display is an advertisement or a simulated floor covering. The floor covering to be simulated can be carpeting.

In one arrangement of the method, the non-transparent cable can be a fiber optic cable, and the method can further include the step of incorporating the receiving structure into an infrastructure. As an example, the infrastructure can be a travel way that supports at least one of vehicular traffic and pedestrian traffic.

The method can also include the step of providing a light emitting controller having a central microprocessor and a port for receiving data. In another arrangement, the method can further include the steps of connecting the port of the light emitting controller to a communications network to permit the central microprocessor to receive data and transmitting from a remote location the data along the communications network to the central microprocessor.

In another arrangement, the method can further include the step of programming the central microprocessor with the design. The communications network can be the Internet, and the remote location can include a computer. Additionally, the method can include the steps of selecting the pre-programmed design to be displayed from the computer at the remote location and displaying the advertisement in accordance with a predetermined interval.

DETAILED DESCRIPTION OF THE PREFERRED EMBODIMENTS

Figure 1:
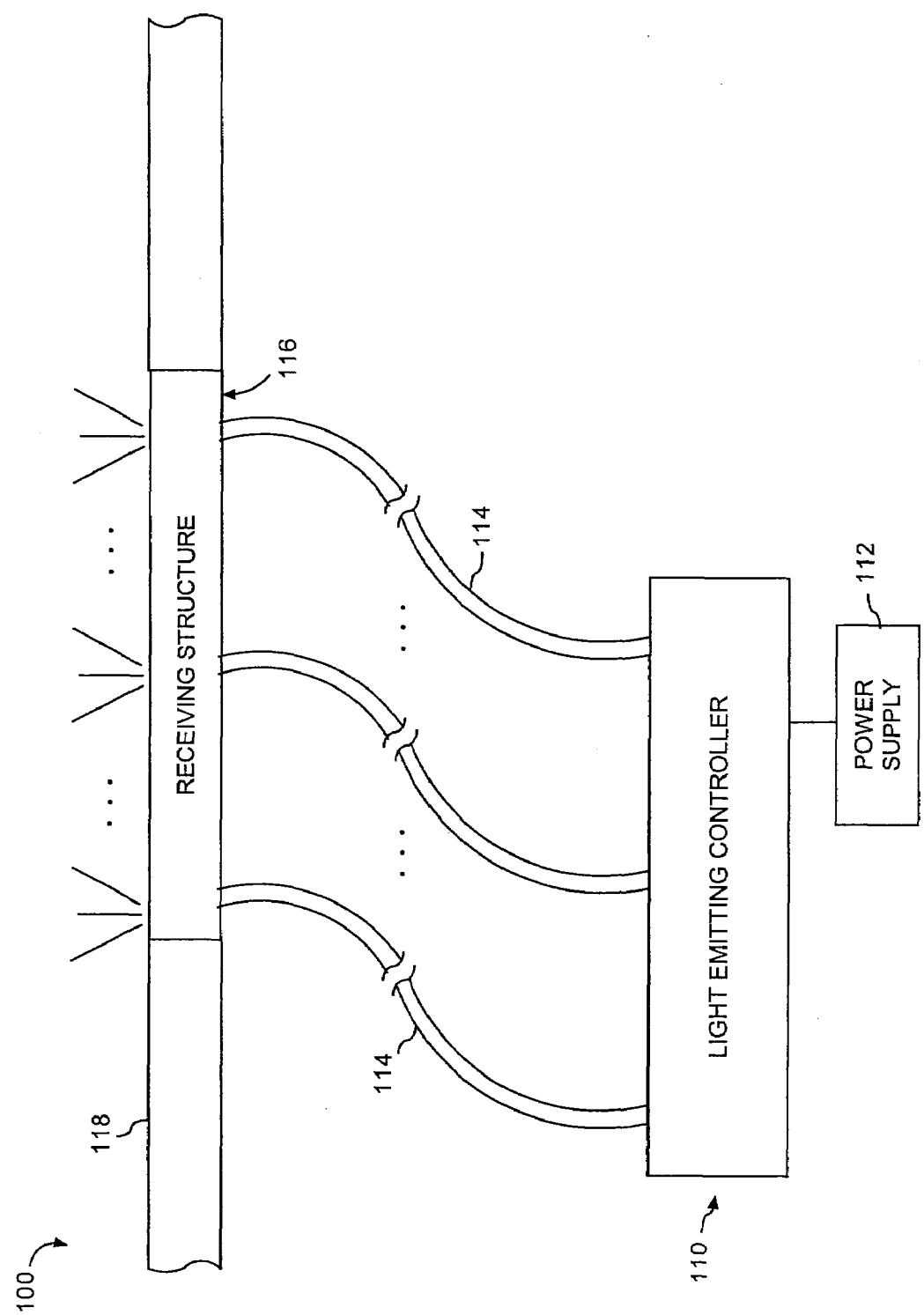
FIG. 1 illustrates a lighting display system in accordance with the inventive arrangements.

Referring to FIG. 1, a lighting display system 100 is illustrated. The system 100 can include a light emitting controller 110, a power supply 112 coupled to the light emitting controller 110, one or more non-transparent cables 114 for transmitting light and a receiving structure 116. Although FIG. 1 shows the system 100 as containing only three non-transparent cables 114, the system 100 can contain any suitable number of non-transparent cables 114, a feature that is represented by the sequence of dots between the cables 114 that are illustrated. The non-transparent cables 114 can be coupled to the light emitting controller 110 and the receiving structure 116 such that the non-transparent cables 114 transmit light from the light emitting controller 110 to the receiving structure 116. The light emitting controller 110 can control the light being transmitted by the non-transparent cables 114. As shown in FIG. 1, light transmitted by the non-transparent cables 114 can be emitted at the receiving structure 116.

Figure 2:
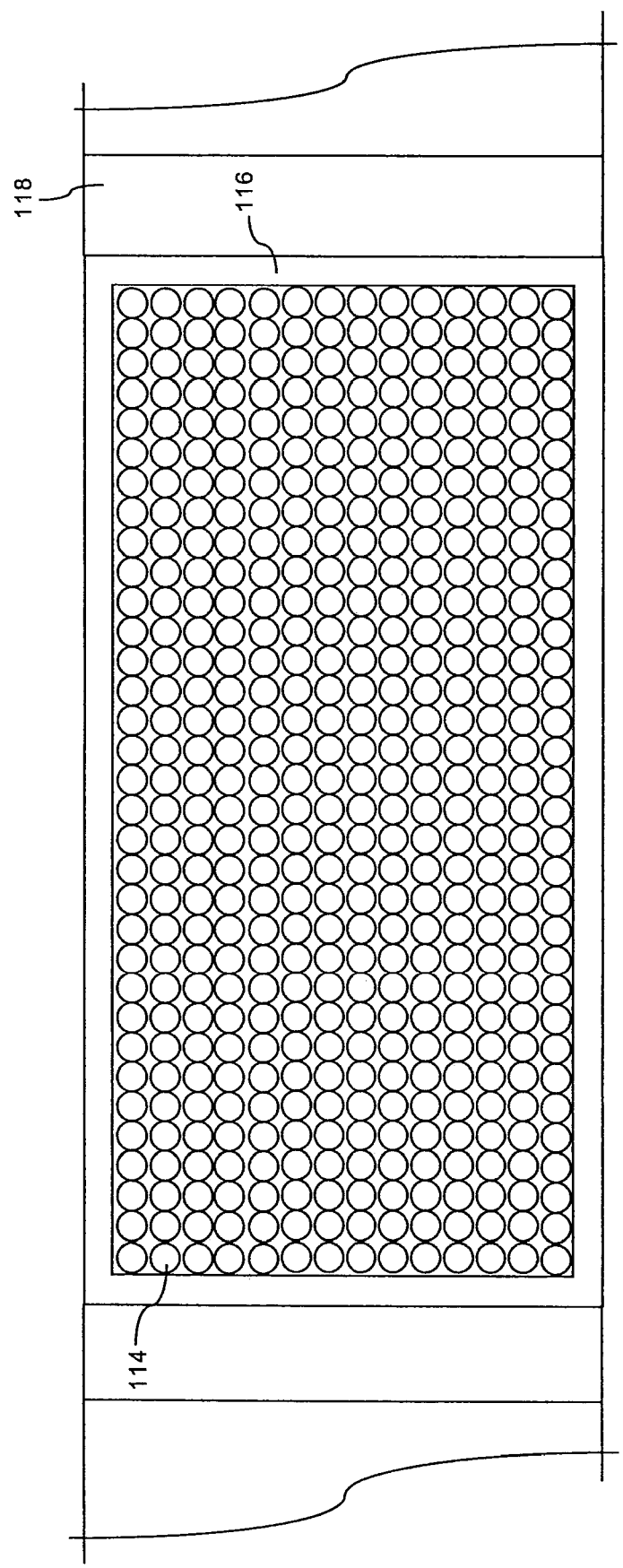
FIG. 2 illustrates a receiving structure in accordance with the inventive arrangements.

The receiving structure 116 can be incorporated into an infrastructure 118. As an example, the infrastructure 118 can be a travel way that supports either vehicular traffic, pedestrian traffic or a combination of the two. The infrastructure 118 can also be an exterior or an interior wall. A top view of one example of a receiving structure 116 integrated into an infrastructure 118 is shown in FIG. 2. The top view of the non-transparent cables 114 received by the receiving structure 116 is also shown. In this example, the infrastructure 118 is a sidewalk, and the receiving structure 116 can support pedestrian traffic moving along the sidewalk. It is understood, however, that the invention is not limited to this particular example.

In one embodiment and referring to FIGS. 1 and 2, the receiving structure 116 can be at a location that is remote to the light emitting controller 110. For example, the receiving structure 116 can be built into a floor of a building, and the light emitting controller 110 can be positioned in a maintenance room located on another floor. Such an arrangement can permit one or more light emitting controllers 110 in a central location to control the light being transmitted to a plurality of receiving structures 116 located on separate floors. Alternatively, the light emitting controller 110 and the receiving structure 116 can be integrated into a single unit in which the non-transparent cables 114 can be relatively short. It is understood, however, that the invention is in no way limited to these examples.

The system 100 can be used to display one or more designs. As will be explained later, the light emitting controller 110 can contain suitable software and circuitry for controlling the intensity and the color of the light transmitted by the non-transparent cables 114. As this light is emitted, a user or passerby will see any number of designs being displayed at the receiving structure 116. For example, the receiving structure 116 can be built into a flooring surface intended to carry pedestrian traffic, and the design to be displayed can be an advertisement or a simulated floor covering, such as simulated carpeting. Of course, the design is not limited to these examples, and more discussion concerning the overall operation of the system 100 will follow.

Figure 3:
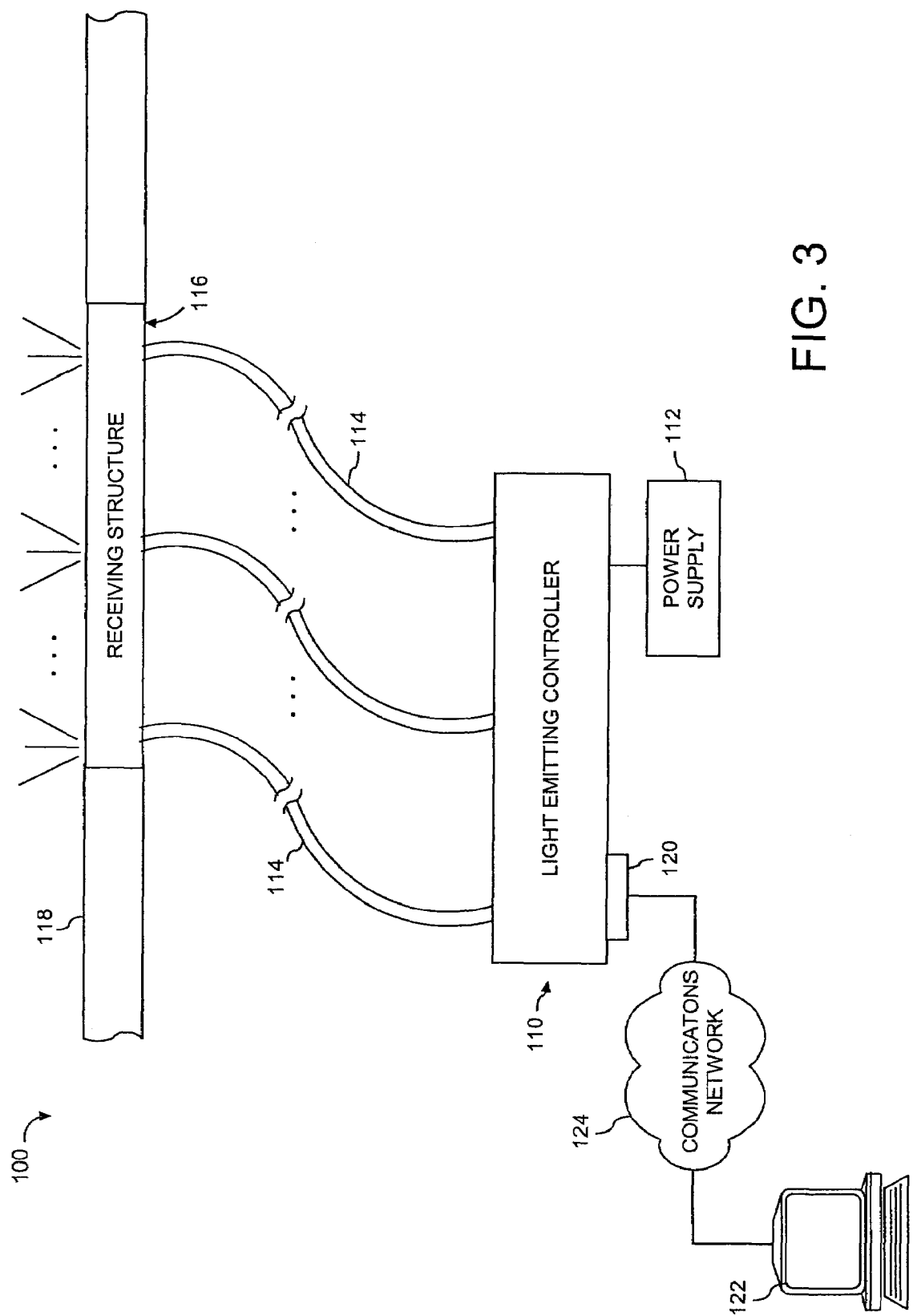
FIG. 3 illustrates the lighting display system of FIG. 1 controlled from a remote location in accordance with the inventive arrangements.

Referring to FIG. 3, the light emitting controller 110 can include a port 120 for receiving data from a communications network 124. A computer 122 loaded with suitable software can be coupled to the communications network 124 and can transmit data to the light emitting controller 110 over the communications network 124 and through the port 120. As such, the light emitting controller 110 can receive data from a remote location. In one arrangement, the communications network 124 can be the Internet, although the invention is not limited to this particular example. In addition, the light emitting controller 110 is not limited to the receipt of data from a remote location as shown in FIG. 3, as the light emitting controller 110 can also receive data locally from a computer 122.

Figure 4:
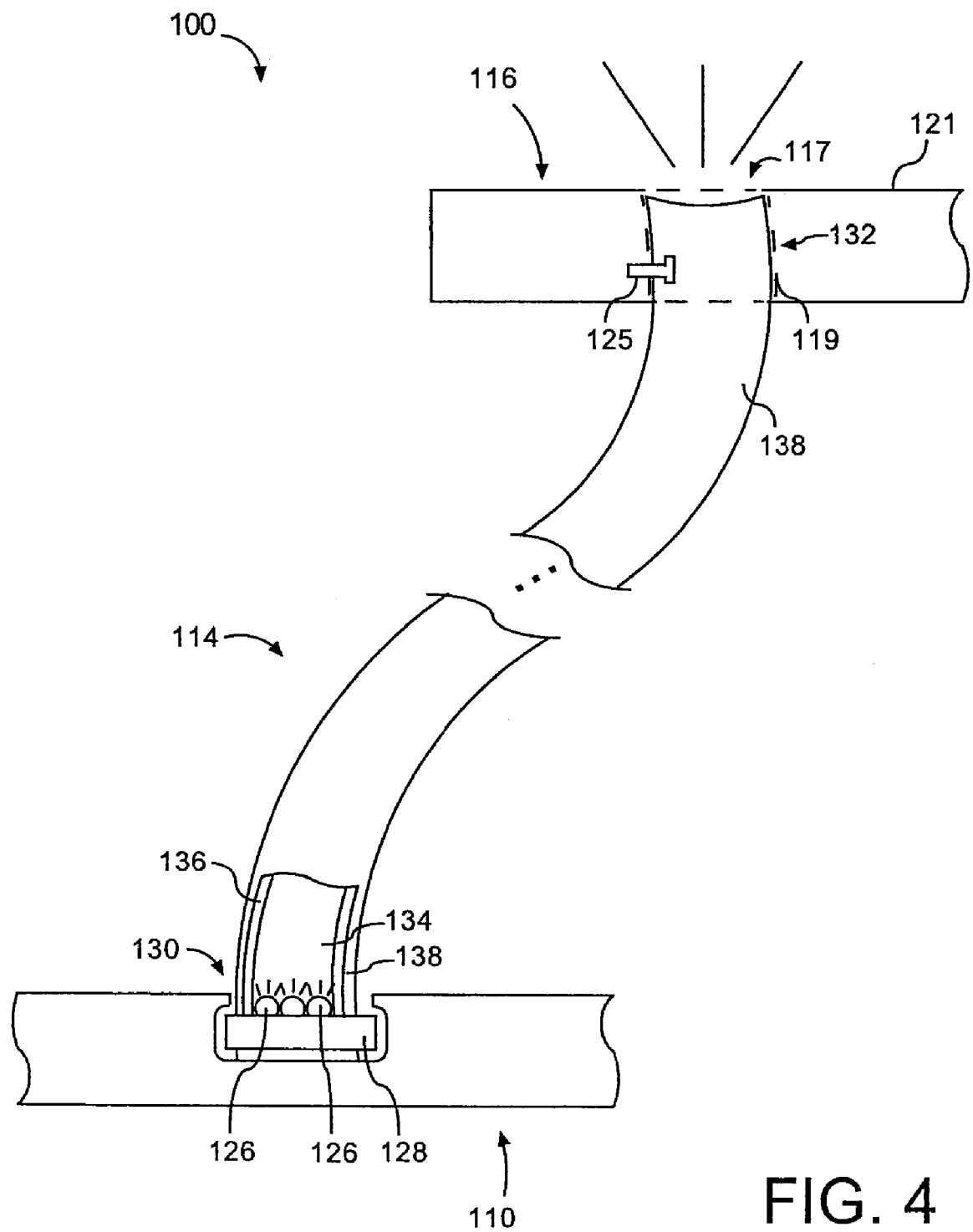
FIG. 4 illustrates a non-transparent cable for transmitting light in accordance with the inventive arrangements.

One example of a non-transparent cable 114 is illustrated in FIG. 4. One or more light emitting diodes (LED) 126 can be disposed at a first end 130 of the non-transparent cable 114. The non-transparent cable 114 can transmit the light emitted from the LEADS 126 to the receiving structure 116, where the light can be emitted from a second end 132 of the non-transparent cable 114. Although FIG. 4 shows three LEADS 126, it is understood that any suitable number of LEADS 126 can be disposed at the first end 130 of the non-transparent cable 114. The LEADS 126 can be positioned on a base 128, which can be part of the light emitting controller 110.

In one arrangement, the non-transparent cable 114 can be a fiber optic cable having a core 134 made of glass or transparent plastic, a layer of cladding 136 wrapped around at least a portion of the core 134 and a buffer coating 138 wrapped around at least a portion of the cladding 136. As those of ordinary skill in the art will appreciate, the cladding 136 serves to reflect the light transmitted along the core 134 back into the core 134, and the buffer coating 138 can protect the non-transparent cable 114 from damage or moisture. It is understood, however, that the system 100 is not limited to the use of fiber optic cables, as any other suitable cable that can transmit light to the receiving structure 116 with relatively little leakage can be used with the invention.

In one arrangement, three LEADS 126 can be disposed at the first end 130 of the non-transparent cable 114 with each LED 126 constructed to emit a separate colored light. For example, each LED 126, when forward biased, can emit a different one of the three primary colors of the visible electromagnetic spectrum, i.e., red, green and blue. As is known in the art, the intensity of primary colored light emitted from each LED 126 can be modified. By varying the amount of primary colored light emitted from each LED 126, the LEADS 126, in combination, can be used to generate light of virtually any color in the visible spectrum. The circuitry for controlling the LEADS 126 will be described later. It is understood, however, that the invention is not limited to this particular arrangement. For example, all the LEADS 126 can be constructed to emit similarly colored light. In addition, only one or two LEADS 126 may be disposed at the end 130 of the non-transparent cable 114 for emitting less than all the primary colors or any other suitable colored light. Additionally, more than three LEADS 126 may employed, each of which may be constructed to emit any type of colored light.

The receiving structure 116 can include one or more apertures 117 for receiving the second ends 132 of at least a portion of the non-transparent cables 114. Each of the apertures 117 of the receiving structure 116 can include an inner surface 119, and the receiving structure 116 can have a top surface 121, which can include any surface area located between the apertures 117. In one arrangement, the top surface 121 of the receiving structure 116 can rise slightly above the tops of the non-transparent cables 114 or to a level substantially level with the tops of the non-transparent cables 114 so as to bear the brunt of the compressive forces generated by any traffic passing over the receiving structure 116.

The apertures 117 can have a diameter in which the inner surface 119 of the aperture 117 can directly contact the buffer coating 138 of the second end 132. The second ends 132 of the non-transparent cables 114 can be held in place by the friction produced by the contact between the inner surface 119 of each of the apertures 132 the buffer coating 138. In addition, any suitable structure or composition can be used to supplement this contact to help hold the non-transparent cables 114 in place.

For example, an adhesive may be applied to at least a portion of the inner surface 119 of the aperture 117 and also to at least a portion of the buffer coating 138 of the second end 132 of the non-transparent cable 114. When the non-transparent cable 114 is set, the adhesive can supplement the contact between the buffer coating 138 and the inner surface 119. As another example, one or more fastening structures 125, such as screws or nails, may be used to secure the second ends 132 of the non-transparent cable 114 to the inner surface 119.

Figure 5:
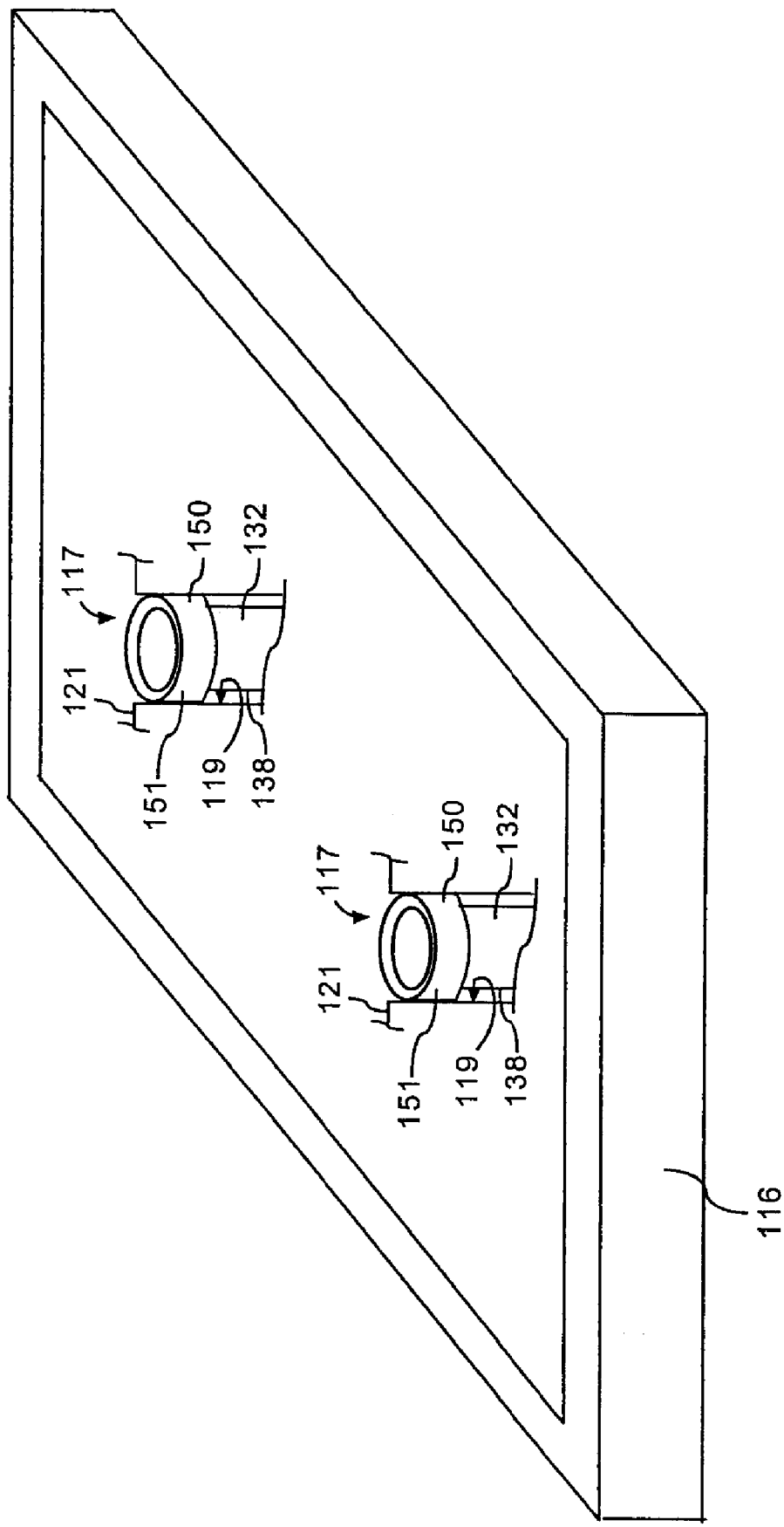
FIG. 5 illustrates a receiving structure for supporting pedestrian or vehicular traffic in accordance with the inventive arrangements.

Suitable structure may be used to improve the ability of the non-transparent cables 114 to support foot or vehicular traffic, in addition to the top surface 121 of the receiving structure 116. For example, referring to FIG. 5, a rigid enclosure 150 of a suitable thickness can be wrapped substantially around the second ends 132 over the buffer coating 138 of one or more of the non-transparent cables 114. For purposes of clarity, only a few of the non-transparent cables 114 having the rigid enclosures 150 and a portion of the top surface 121 are shown. The rigid enclosure 150 can have a shape that substantially matches the shape of the second end 132 of each non-transparent cable 114 around which the enclosure 150 will be positioned. It must be noted, however, that the rigid enclosure 150 is not so limited, as the enclosure 150 can have any other suitable shape. The rigid enclosure 150 can be constructed of any suitable material capable of withstanding deformation when placed under varying amounts of weight. Examples include steel, metal alloys or plastic.

The rigid enclosure 150 can include an outside surface 151 that can engage the inner surface 119 of the aperture 117. The outer surface 151 of the rigid enclosure 150 can be secured to the inner surface 119 of the aperture 117 in ways similar to those discussed in relation to FIG. 4. Specifically, the outside surface 151 can be bonded or fastened to the inner surface 119 with an adhesive or a fastening structure. In an alternative arrangement, the outer surface 151 can be welded to the inner surface 119. It is understood, however, that the invention is not limited to these examples, as any other suitable device, composition or process may be used to supplement the engagement of the second ends 132 (with or without the rigid enclosure 150) with the inner surface 119 of the apertures 117 of the receiving structure 116.

Figure 6:
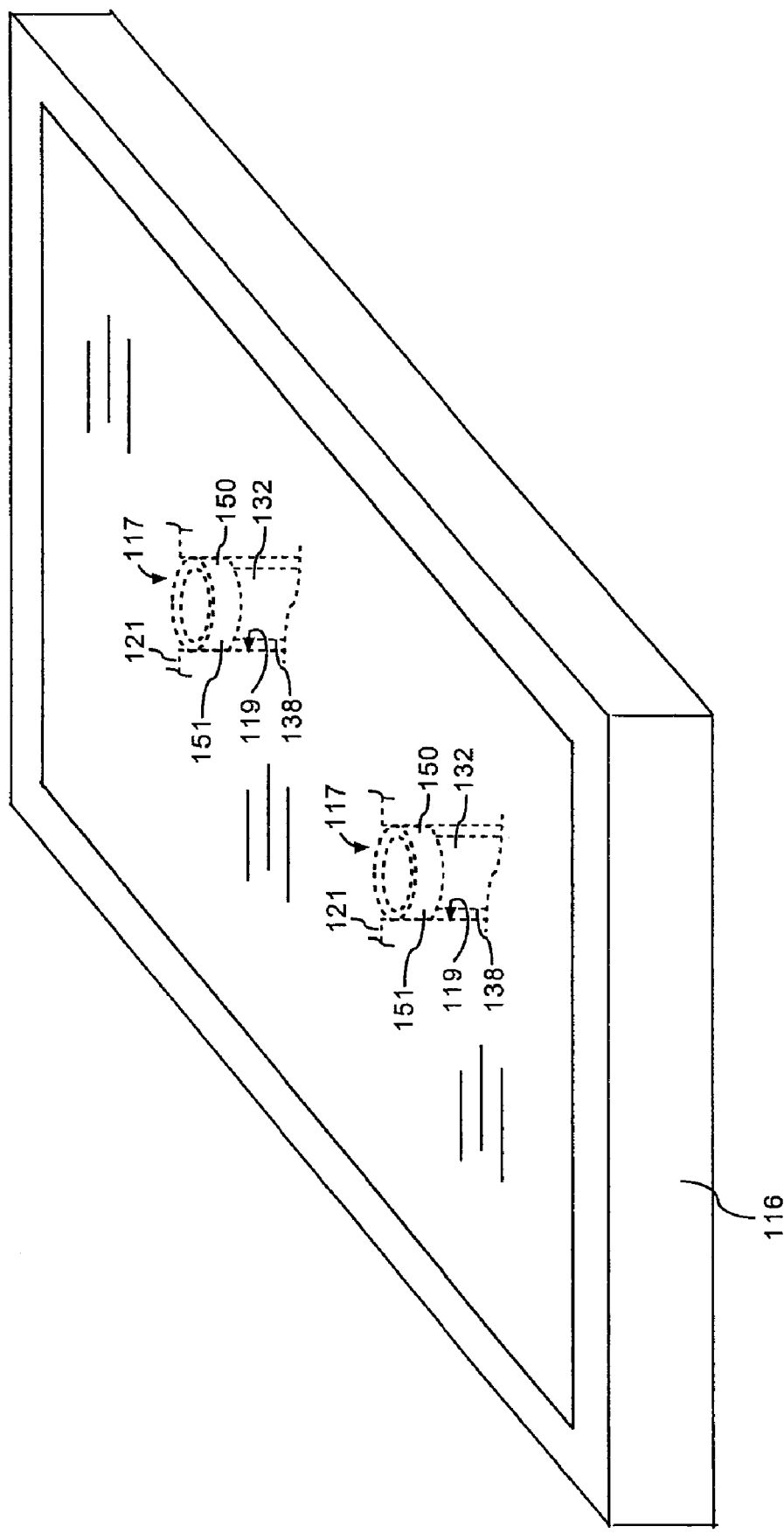
FIG. 6 illustrates another receiving structure for supporting pedestrian or vehicular traffic in accordance with the inventive arrangements.

In an alternative arrangement and referring to FIG. 6, a substantially transparent, rigid sheet 152 may be mounted to the receiving structure 116 and placed over the second ends 132 of the non-transparent cables 114 and the top surface 121 of the receiving structure 116. Again, only a portion of the non-transparent cables 114 and a portion of the top surface 121 are illustrated here. The non-transparent cables 114 and the other associated components are represented with a dashed outline to indicate their positioning under the rigid sheet 152. As an example, the rigid sheet 152 can be Plexiglas of a thickness suitable for supporting pedestrian or vehicular traffic. In this arrangement, the positioning of rigid enclosures 150 around the second ends 132 of the non-transparent cables 114 is optional.

Figure 7:
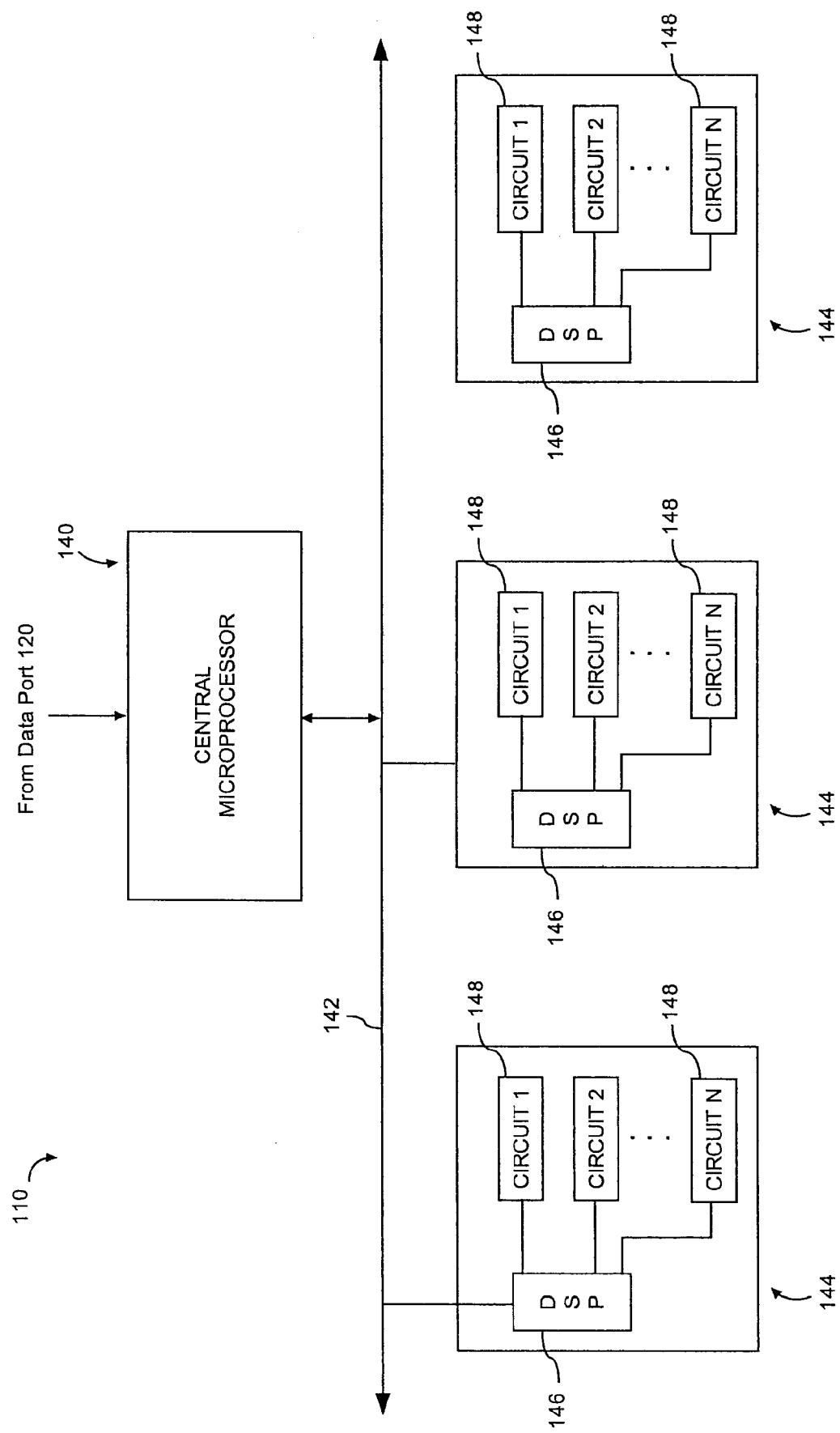
FIG. 7 illustrates an example of a portion of a light emitting controller in accordance with the inventive arrangements.

Referring to FIG. 7, certain components of the light emitting controller 110 for controlling the intensity of the light emitted from the LEADS 126 (see FIG. 4) are shown. Specifically, the light emitting controller 110 can include a central microprocessor 140, a bus 142 and one or more cards 144. The central microprocessor 140 and each of the cards 144 can be coupled to the bus 142, which can be, for example, a thirty-two bit bus. Nevertheless, other bus sizes may be used with the invention. The cards 144 can contain the circuitry required to control the light being emitted from each of the LEADS 126 (see FIG. 3). In one arrangement, each card 144 can include a digital signal processor 146 and one or more circuits 148. Each of the circuits 148 on a particular card 144 can be coupled to the digital signal processor 146, which can transmit pulse width modulated signals to the circuits 148 to enable the selective forward biasing of the LEADS 126 (see FIG. 4).

In one arrangement, the central microprocessor 140 can be programmed with one or more designs to be displayed at the receiving structure 116 (see FIG. 1). Examples of suitable designs include advertisements or digitally generated pictures or animation. As another example, the central microprocessor 140 may be programmed with a simple design, such as a solid color, that could be displayed to simulate a floor covering such as carpeting. Once loaded with the designs, the central microprocessor 140 can be programmed to cause the display of the designs in accordance with a predetermined or random order.

In another arrangement and referring to FIGS. 3 and 7, the central microprocessor 140 can be coupled to the data port 120 to enable a user at a remote or local location to send data to the light emitting controller 110 and the central microprocessor 140. For example, the computer 122 can be loaded with suitable software to permit a user to select a particular design to be displayed at the receiving structure 116. The user's selection can be transmitted from the computer 122 to the light emitting controller 110 and the central microprocessor 140 over the communications network 124 and through the port 120. In response, the central microprocessor 140 can cause the selected design to be displayed at the receiving structure 116.

Figure 8:
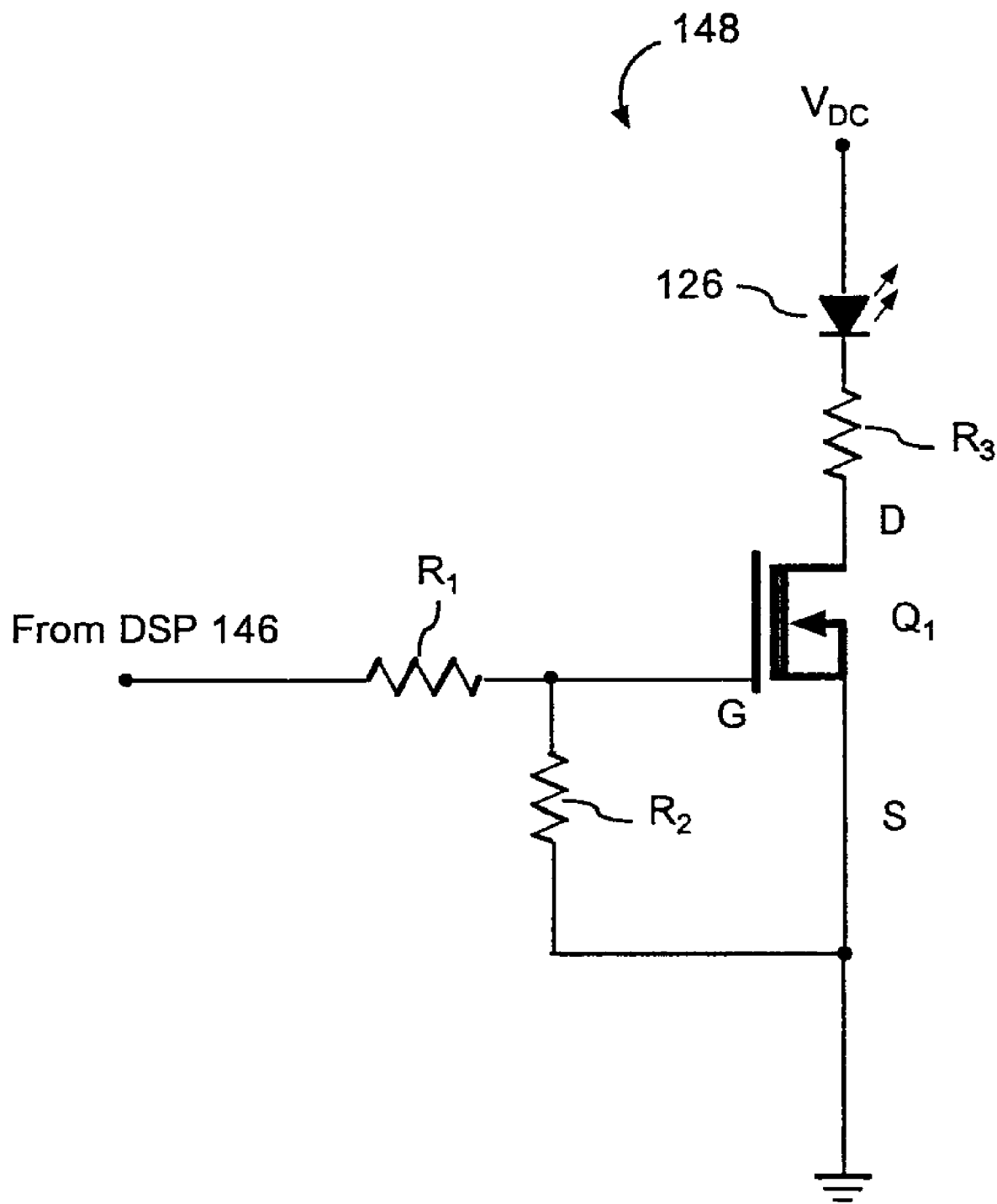
FIG. 8 illustrates a circuit for selectively forward biasing a light emitting diode in accordance with the inventive arrangements.

Referring to FIG. 8, an example of a suitable circuit 148 for selectively activating the LEADS 126 is shown. The circuit 148 can include resistors $R_1$ and $R_2$, a current-limiting resistor $R_3$, a transistor $Q_1$, and one or more of the LEADS 126. When the transistor $Q_1$ is turned on, current can flow through the LED 126 thereby causing the LED 126 to emit light. The circuit 148 can receive a pulse width modulated input from the digital signal processor 146 (see FIG. 7), which can serve as a gate drive input signal to the transistor $Q_1$. It is this gate drive input signal that can be used to vary the intensity of the light emitted by the LED 126. Resistor $R_3$ can limit the amount of current flowing through the LED 126 to protect the LED 126 from damage.

Referring to FIGS. 7 and 8, the overall operation for controlling the intensity of the light emitted by the LEADS 126 will now be explained. Based on the design to be displayed, the central microprocessor 140 can transmit signals over the bus 142 to the appropriate digital signal processors 146. The digital signal processors 146 process the signals from the central microprocessor 140 and signals each of the appropriate circuits 148 with a pulse width modulated signal. As noted earlier, the signals from the digital signal processors 146 serve as gate drive input signals for the transistor $Q_1$. The duty cycle of the gate drive input signal can determine the intensity of the light emitted by the LED 126. For example, a higher duty cycle causes the intensity of the emitted light to be higher, whereas a lower duty cycle causes the intensity to drop. Thus, the design to be displayed determines the duty cycle for each particular gate drive input signal and, hence, the intensity of each of the LEADS 126.

As noted earlier, each of the non-transparent cables 114 can combine to form a display. As an example, and referring to FIGS. 2, 4, 7 and 8, one green LED 126, one red LED 126 and one blue LED 126 can be disposed at the first end 130 of the non-transparent cable 114, and the central microprocessor 140 can be programmed with a design that will cause each of the non-transparent cables 114 to emit green light. In accordance with the inventive arrangements, the central microprocessor 140 can signal the appropriate digital signal processors 146. In response, the duty cycle for the gate drive input signals for the circuits 148 used to turn on the red and blue LEADS 126 can be approximately zero, which will prevent these LEADS 126 from emitting light. In contrast, the duty cycle for the input signals to those circuits 148 used to turn on the green LEADS 126 can be high, which will cause these LEADS 126 to emit green light at a relatively high intensity. As such, a user viewing the receiving structure 116 will see green light being emitted from each of the non-transparent cables 114.

Those of ordinary skill in the art will appreciate that the invention is in no way limited to this particular example. Notably, the LEADS 126 can be selectively controlled to display many other colors and far more complex designs. For example, to display a magenta color, red and blue LEADS 126 can be turned on (with the duty cycle of the input signal being relatively high), and the green LEADS 126 can be turned off. In addition, each of the green, red and blue LEADS 126 can be turned on with each of the intensities of their emitted light being dependent on the duty cycle of the gate drive input signals. Because each individual LED 126 can be controlled through a separate circuit, different portions of the plurality of non-transparent cables 114 can combine to display the complex designs. As a result, if the receiving structure 116 is built into a floor, for example, a user may use the receiving structure 116 and the non-transparent cables 114 to simulate carpeting in which the appearance of the carpeting can assume many different styles or designs.

As noted earlier, the invention can also be used to display advertisements. Specifically, the central microprocessor 140 can be programmed with an advertisement, and the advertisement can be displayed in accordance with the above discussion. Many different advertisements may be displayed using the invention with little effort required to change the display. The advertisement can be displayed on a continuous basis or can be shown for a predetermined amount of time. If the receiving structure 116 is built into a travel way, the advertisement may be directly displayed to individuals walking over the receiving structure 116, which will serve as a highly visible and attractive promotion. The system 100 can be used to display advertisements associated with the owner of the system 100, or alternatively, advertising space can be sold to other parties.

Figure 9:
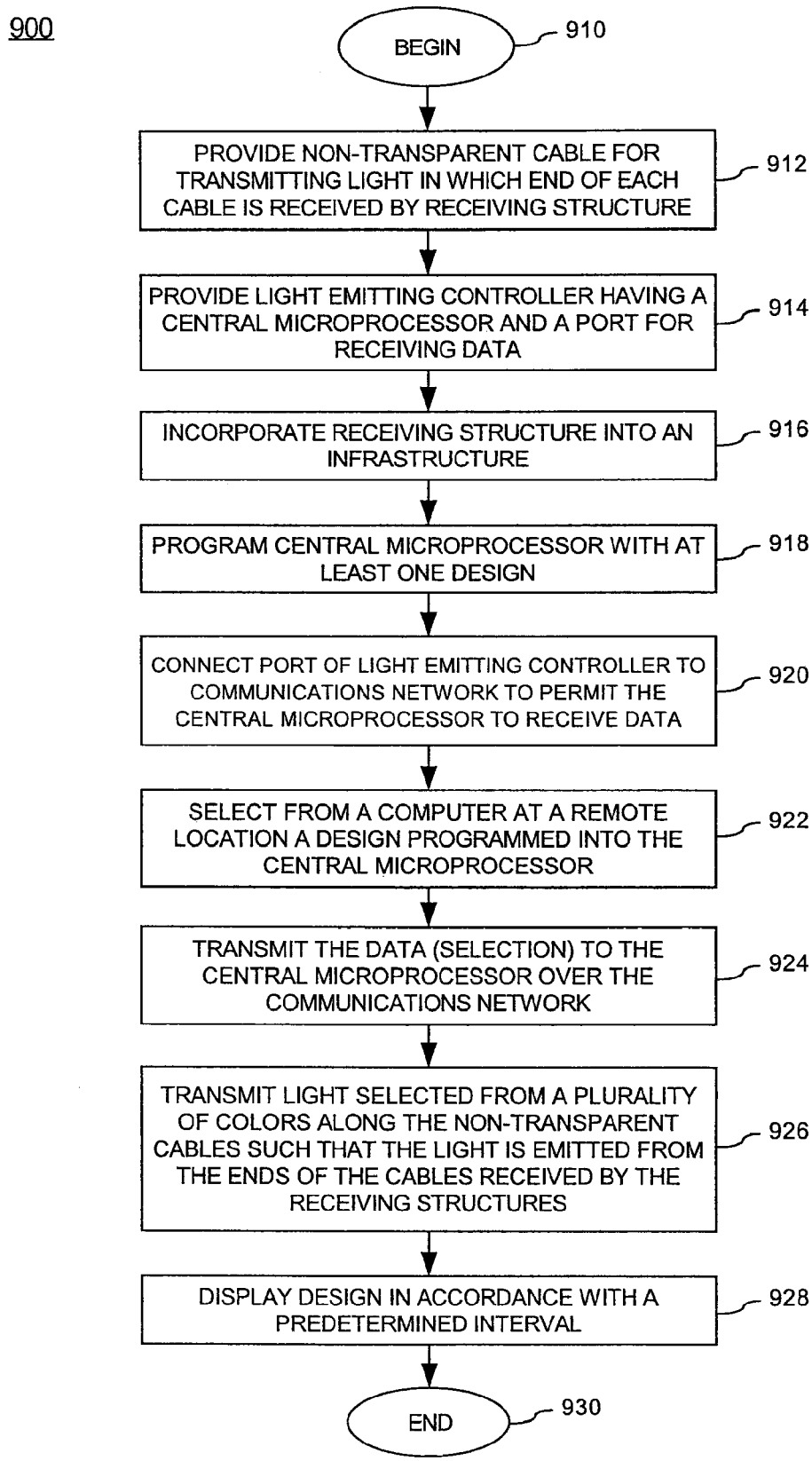
FIG. 9 illustrates a flowchart showing one example of a method for displaying designs in accordance with the inventive arrangements.

Referring to FIG. 9, a method 900 for displaying one or more designs is shown. At step 910, the method 900 can begin. At step 912, at least one non-transparent cable for transmitting light can be provided in which an end of each non-transparent cable is received by a receiving structure. In accordance with step 914, a light emitting controller having a central microprocessor and a port for receiving data can also be provided. As shown at step 916, the receiving structure can be incorporated into an infrastructure, such as a wall or a travel way capable of supporting at least one of vehicular or pedestrian traffic. At step 918, the central microprocessor can be programmed with at least one design, which can be an advertisement or a design that can simulate a floor covering when displayed. At step 920, the port of the light emitting controller can be connected to a communications network to permit the central microprocessor to receive data.

As shown at step 922, a user can select from a computer at a remote location a design that has been programmed into the central microprocessor. In accordance with step 924, the data or selection can be transmitted to the central microprocessor over the communications network. In response, light selected from a plurality of colors can be transmitted along the non-transparent cables such that the light is emitted from the ends of the non-transparent cables received by the receiving structure, as shown at step 926. The emitted light can form a display in accordance with the pre-programmed design, which can be viewed by, for example, visitors to a home, pedestrians or individuals riding in an automobile. At step 928, the design can be displayed in accordance with a predetermined interval. Finally, at step 930, the method 900 can end.

It is understood that the foregoing method is merely one example of displaying advertisements in accordance with the inventive arrangements. Accordingly, the scope of the claims is not intended to be limited to this particular example. Additionally, although the present invention has been described in conjunction with the other embodiments disclosed herein, it should be understood that the foregoing description is intended to illustrate and not limit the scope of the invention as defined by the claims.

What is claimed is:

1. A method for displaying advertisements, comprising the steps of:

providing at least one group of light emitting diodes, the at least one group of light emitting diodes comprising a plurality of light emitting diodes, each light emitting diode emitting light of a color distinctly different from the color of light emitted by another light emitting diode of the group of light emitting diodes;

providing a receiving structure including at least one rigid enclosure or rigid sheet having a structural strength to bear compressive forces generated by pedestrian or vehicular traffic;

providing at least one non-transparent cable for transmitting light, wherein each group of light emitting diodes is disposed at a first end of one of the at least one non-transparent cables and a second end of the at least one non-transparent cable is received by the receiving structure, the light emitting diodes being located remote from the receiving structure;

controlling the intensity and color of the light emitted from the second end of the at least one non-transparent cable received by the receiving structure by selective forward biasing the individual light emitting diodes of each group of light emitting diodes with a pulse width modulated signal that generates a unique duty cycle for each individual light emitting diode; and wherein the color of the light emitted from the second end of each of the at least one non-transparent cables at the receiving structure is a combination of the colors of the light emitted from the plurality of light emitting diodes in the group of light emitting diodes disposed at the first end of the respective non-transparent cable and the emitted light is used in the display of an advertisement at the receiving structure in accordance with at least one of a pre-programmed design.

2. The method according to claim 1, wherein the non-transparent cable is a fiber optic cable.

3. The method according to claim 1, further comprising the step of incorporating the receiving structure into an infrastructure.

4. The method according to claim 3, wherein the infrastructure is a travel way that supports at least one of vehicular traffic and pedestrian traffic.

5. The method according to claim 1, further comprising the step of providing a light emitting controller having a central microprocessor, wherein the light emitting controller also has a port for receiving data.

6. The method according to claim 5, further comprising the steps of:

connecting the port of the light emitting controller to a communications network to permit the central microprocessor to receive data; and transmitting from a remote location the data along the communications network to the central microprocessor.

7. The method according to claim 6, further comprising the step of programming the central microprocessor with the design.

8. The method according to claim 7, wherein the communications network is the Internet and the remote location includes a computer.

9. The method according to claim 8, further comprising the step of selecting the pre-programmed design to be displayed from the computer at the remote location.

10. The method according to claim 1, further comprising the step of displaying the advertisement in accordance with a predetermined interval.

11. A method for displaying advertisements, comprising the steps of:
   providing at least one group of light emitting diodes, the at least one group of light emitting diodes comprising a plurality of light emitting diodes, each light emitting diode emitting light of a color distinctly different from the color of light emitted by another light emitting diode of the group of light emitting diodes;
   providing a receiving structure including at least one rigid enclosure or rigid sheet having a structural strength to bear compressive forces generated by pedestrian or vehicular traffic;
   providing at least one non-transparent cable for transmitting light, wherein each group of light emitting diodes is disposed at a first end of one of the at least one non-transparent cables and a second end of the at least one non-transparent cable is received by the receiving structure, the light emitting diodes being located remote from the receiving structure;
   controlling the intensity and color of the light emitted from the second end of the at least one non-transparent cable received by the receiving structure by selective forward biasing the individual light emitting diodes of each group of light emitting diodes with a pulse width modulated signal that generates a unique duty cycle for each individual light emitting diode; and
   wherein the color of the light emitted from the second end of each of the at least one non-transparent cables at the receiving structure is a combination of the colors of the light emitted from the plurality of light emitting diodes in the group of light emitting diodes disposed at the first end of the respective non-transparent cable and the emitted light is used in the simulated display of a floor covering at the receiving structure in accordance with at least one of a pre-programmed design.

12. The method according to claim 11, wherein the floor covering to be simulated is carpeting.

* * * * *